(12) United States Patent
Xia et al.

(10) Patent No.: US 12,496,571 B2
(45) Date of Patent: Dec. 16, 2025

(54) PRIMARY AMINE AEROGEL AND METHOD OF MANUFACTURE

(71) Applicant: PALO ALTO RESEARCH CENTER INCORPORATED, Palo Alto, CA (US)

(72) Inventors: Kelly Xia, Berkeley, CA (US); Stephen Matthew Meckler, Boulder, CO (US); Jonathan Bachman, San Francisco, CA (US); Mahati Chintapalli, Mountain View, CA (US); Gabriel Iftime, Newark, CA (US)

(73) Assignee: XEROX CORPORATION, Norwalk, CT (US)

( * ) Notice: Subject to any disclaimer, the term of this patent is extended or adjusted under 35 U.S.C. 154(b) by 709 days.

(21) Appl. No.: 17/897,525

(22) Filed: Aug. 29, 2022

(65) Prior Publication Data

US 2024/0082818 A1    Mar. 14, 2024

(51) Int. Cl.
*B01J 20/26* (2006.01)
*B01J 20/28* (2006.01)

(52) U.S. Cl.
CPC ....... *B01J 20/262* (2013.01); *B01J 20/28047* (2013.01); *B01J 20/28061* (2013.01)

(58) Field of Classification Search
None
See application file for complete search history.

(56) References Cited

U.S. PATENT DOCUMENTS 4,713,236 A * 12/1987 Hoover .................... A61Q 5/12
424/70.17
5,925,379 A * 7/1999 Mandeville, III ..... A61K 31/74
525/903
2021/0370226 A1    12/2021 Chintapalli et al.

OTHER PUBLICATIONS

Lee et al., "Silica-Supported Sterically Hindered Amines for CO2 Capture," Langmuir 34:41, pp. 12279-12292, Sep. 24, 2018.
(Continued)

*Primary Examiner* — Satya B Sastri
(74) *Attorney, Agent, or Firm* — Miller Nash LLP

(57) ABSTRACT

A polymer compound containing groups having the chemical structure:

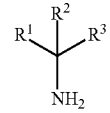

where $NH_2$ is a primary amine, and R is not hydrogen, and a polymer backbone wherein two of the R groups are part of the polymer backbone. A method of synthesizing a polymer includes polymerizing amine-convertible monomers to produce a polymer, causing a deprotection reaction with the polymer to form an isocyanate, decomposing the isocyanate to form a polymer containing primary amines. A method to separate CO2 from other gases comprising using a sorbent containing a polymer compound having the structure:

(Continued)

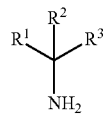

where NH₂ is a primary amine, and R is not hydrogen, and a polymer backbone wherein two of the R groups are part of the polymer backbone.

6 Claims, 3 Drawing Sheets

(56) References Cited

OTHER PUBLICATIONS

Koutsianos, et al. "Drastic enhancement of carbon dioxide adsorption in fluoroalkyl-modified poly(allylamine)," J. Mater. Chem. A, 9, pp. 10827-10837.

* cited by examiner

PRIMARY AMINE AEROGEL AND METHOD OF MANUFACTURE

TECHNICAL FIELD

This disclosure relates to a support-free, porous, organic, polymer material, more particularly to the material that uses primary amines.

BACKGROUND

Rising levels of greenhouse gases in the atmosphere is undoubtedly the most pressing threat to human survival we will face in the coming century. Current atmospheric $CO_2$ concentrations are around 400 ppm, equivalent to the mid-Pliocene era, when global sea levels were 25 meters higher, and temperatures were 2-3° C. warmer globally, and as much as 10-20° C. higher at the poles. As global temperatures rise and climate-related natural disasters become increasingly frequent, the need will become not only curbing greenhouse gas emissions but also achieving negative emissions to maintain a livable planet. Developing economically viable materials for $CO_2$ capture both at emissions sources and directly from the atmosphere are therefore topics of great research interest and value.

An ideal material for $CO_2$ capture is cheap to produce, has a high capacity for $CO_2$ (usually measured in mmol $CO_2$ per gram of material), fast kinetics of (de)sorption, and has good long-term stability to contaminants and repeated adsorption/desorption cycles. Amine-containing polymers are one promising type of material for $CO_2$ capture. Such materials also have utility as ion exchange resins and membranes, as the amine functionality can act as both a Bronsted acid and base, and as a nucleophile.

SUMMARY

According to aspects illustrated here, there is provided a polymer compound containing groups having the chemical structure:

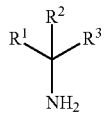

where $NH_2$ is a primary amine, and R is not hydrogen, and a polymer backbone wherein two of the R groups are part of the polymer backbone. A method of synthesizing a polymer includes polymerizing amine-convertible monomers to produce a polymer, causing a deprotection reaction with the polymer to form an isocyanate, decomposing the isocyanate to form a polymer containing primary amines. A method to separate CO2 from other gases comprising using a sorbent containing a polymer compound having the structure:

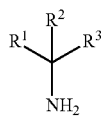

where $NH_2$ is a primary amine, and R is not hydrogen, and a polymer backbone wherein two of the R groups are part of the polymer backbone.

DETAILED DESCRIPTION OF THE EMBODIMENTS

The embodiments here involve a support-free, porous, organic, polymer material that uses primary amines. The method of producing this material employs a more thermodynamically favorable chemical transformation than current approaches, which can allow for milder reaction temperature and pH, and faster reaction times. In large scale production, these milder and faster conditions can translate to a large difference in material manufacturing costs, as well as suppression of potential unwanted side reactions. Current materials and the processes from which they result have issues in manufacturability, high costs, and inefficient absorption of $CO_2$.

Primary amines generally have greater adsorption affinity for $CO_2$ as well as superior oxidative stability compared to secondary amines. This has advantages in the capture of CO2 directly from the atmosphere or from a point source such as a fossil fuel power generation facility.

Figure 1:
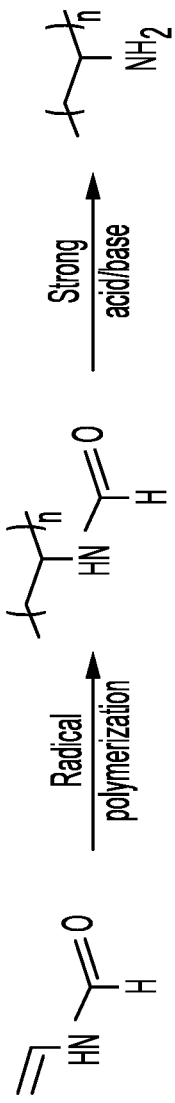
FIGS. 1-3 shows examples of amine-containing polymeric materials for $CO_2$ capture.

As an example of an issue current materials have with costs, polyvinylamine is an attractive material for carbon capture due to it having a very high concentration of primary amines for a radically polymerized material. Vinylamine, however, is unstable and not commercially available, so the amine must be protected during the polymerization process and subsequently deprotected to reveal the active amine-containing polymer. The added processing conditions required to achieve the amine-functionalized structure add to the final material cost. Most polyvinylamine syntheses use vinyl formamide (VF) as the amine-convertible monomer. The formamide group in VF can be removed in post-polymerization processing of the material to yield polyvinylamine structures, as shown in FIG. 1. However, the deprotection process generally requires harsh conditions, such as heating in concentrated aqueous acid and/or base for multiple days. These long processing steps increase both the capital and operating costs of polymer manufacture. In addition, this deprotection procedure can be destructive to the overall material, as it can degrade certain crosslinking units or other incompatible components. For example, all acrylate-containing monomers are incompatible with this method as the acrylate will hydrolyze under the deprotection conditions. The resultant material will not have as high efficiency as the embodiments.

Additionally, VF is considered a relatively unreactive monomer for radical polymerization processes, with a Q value of 0.29 according to the Q-e theory of copolymerization where Q describes reactivity. This makes it less compatible for copolymerization with common cross linkers, which generally consist of styrene (Q=1.0) and acrylate (Q=2.34) type C=C bonds. This mismatch in reactivity leads to low incorporation of VF feed monomers into the material, causing inefficiencies in manufacturing, which can result in higher costs.

In contrast, the amine-convertible monomer used in the embodiments contains an acrylamide-type C=C bond (Q=1.46), which should be much more compatible for copolymerization with most cross linkers.

Figure 2:
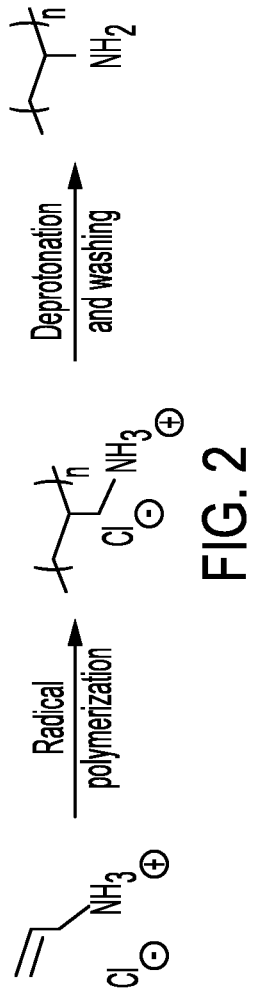

Another option would involve the use of allylamine hydrochloride, requiring no deprotection and only a deprotonation, which can be performed during solvent exchange and drying procedures, as shown in FIG. 2. However, allylamine contains an extra methylene unit, which worsens its theoretical $CO_2$ capacity per gram, without the benefits in oxidative stability of the material in the embodiments.

The material of the embodiments has a unique characteristic in that it allows access to the smallest possible amine-containing unit for which the alpha-carbon of the amine is not directly bonded to any hydrogen atoms. This alpha-carbon is referred to as an "aza-quaternary carbon." The size/simplicity of the unit allows optimal $CO_2$ capacity per gram, and the aza-quaternary alpha-carbon gives the material greatly improved oxidative stability, likely due to a combination of steric hindrance and structural protection. Many oxidative degradation pathways for organic amine units in $CO_2$ capture materials are believed to occur through imine formation. Having three substituents at the amine's alpha-carbon that are not hydrogen, such as alkyl substituents, effectively blocks imine formation. The term "substituent" means one or a group of atoms that replace one or more hydrogen atoms in the parent chain of a hydrocarbon.

Figure 3:
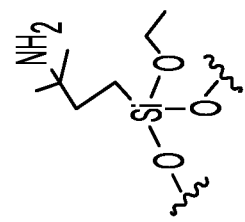

In a study (https://doi.org/10.1021/acs.langmuir.8b02472) of a related structure, shown in FIG. 3, no oxidative degradation was observed under standard testing conditions of 135° C., 21% oxygen, for 24 hours. The reported study used a silica-supported structure, and the material of the embodiments can achieve better $CO_2$ capacity per gram with a support-free organic polymer.

Figure 4:
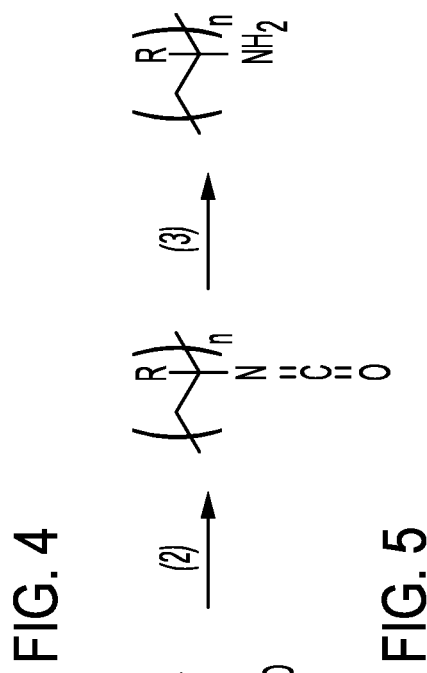
FIG. 4 show a chemical structure for an embodiment of an amine-convertible monomer.

The material of the embodiments contains a primary-amine-containing unit with an aza-quaternary alpha-carbon, such as shown in FIG. 4. The R groups may comprise alkyl, amino, and hydroxyl groups, among others. The polymer containing the primary-amine-containing unit has an alkyl (hydrocarbon) backbone, and $R^1$ and $R^2$ may be part of the polymer backbone. None of the R groups is a hydrogen. The polymer may also be a copolymer with other non-amine-convertible monomers.

Figure 5:
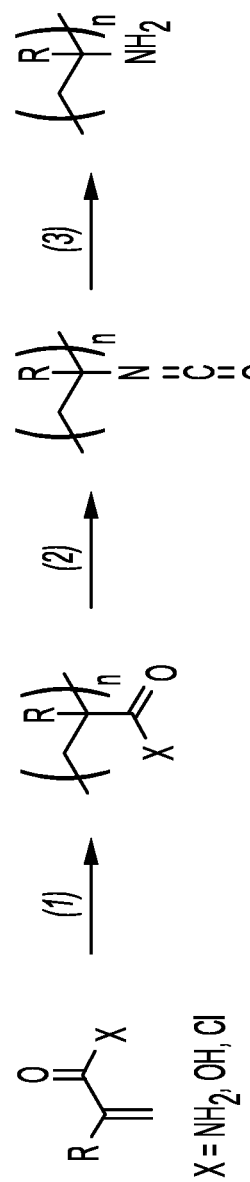
FIG. 5 shows a diagram of an embodiment of a process to convert from an amine-convertible monomer to a primary amine.
Figure 7:
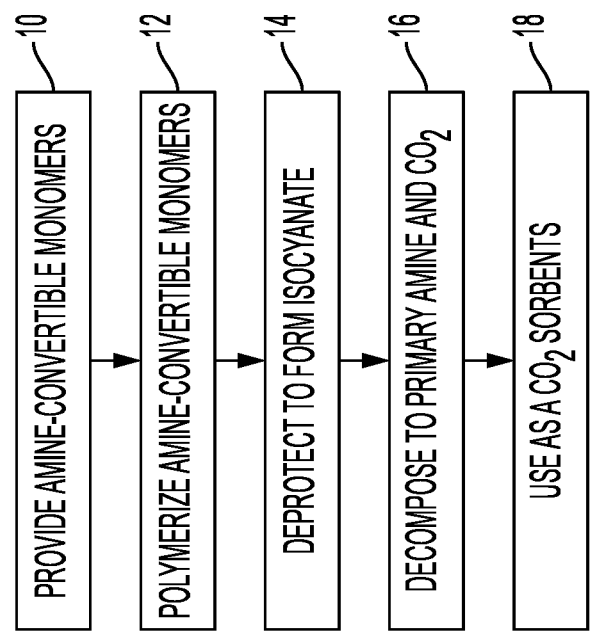
FIG. 7 shows a flow chart of an embodiment of a process to produce a compound

An embodiment of a method to synthesize the material shown in FIG. 4 is shown in diagrammatic form in FIG. 5 and flowchart form in FIG. 7. One should note that the methods of the embodiments may be used to synthesize other structures, as will be discussed in more detail further. Referring to FIGS. 5 and 7, the process begins with amine-convertible monomers, specifically methacrylamide monomers as the amine-containing monomer. The term "amine-convertible monomers" refers to those monomers that can be chemically converted to amines. The monomer then undergoes radical polymerization (1) in FIG. 5, and at 12 in FIG. 7.

The radical polymerization may result in a porous, polymer aerogel manufactured in accordance with the porous polymer aerogel processes developed at PARC. One example of this process is discussed in US Patent Publication No. 20210370226, published Dec. 2, 2021, which is incorporated by reference in its entirety herein.

In an embodiment where the material is contained in a porous polymer aerogel, the amine-convertible monomer is part of a solution including at least a solvent, one or more cross-linkers, one or more radical initiators, and a nitroxide mediator. In some cases, a cross-linker, a molecule capable of linking two or more polymer chains, can also be referred to as a monomer, co-monomer, and a polymer containing a crosslinker and another polymerizable group may be referred to a copolymer. The process includes removing oxygen from the solution, heating the solution to promote polymerization, and performing solvent exchange on the resulting polymer. In the process above, after polymerization, the process includes causing a deprotection reaction to remove groups protecting the amino groups, removing any excess reagents and byproducts of the deprotection reaction, and then drying the material to form a porous, polymer aerogel containing the material discussed above. The aerogels resulting from such a process may have greater than 0.5 mmol nitrogen per gram of polymer structured like the material above, a porosity of greater than 10%, a specific surface area of at least 100 $m^2$/g, a BET (Brunauer-Emmett-Teller) of greater than 50 $m^2$/g, and a wall thickness in the range of 10-1000 nanometers. In other embodiments, specific surface area may be above 10, or 50 $m^2$/g However, this comprises merely one possible form of radical polymerization, other forms of radical polymerization may be used.

In the embodiments here, the deprotection process 14 of FIG. 7 comprises one of either a Hoffman or a Curtius rearrangement to form an isocyanate. A Hoffman rearrangement typically uses sodium hypochlorite (NaClO$_4$, bleach) and sodium hydroxide (NaOH, Bronsted base) at (2) in FIG. 5. Other reagents may include bromine, lead tetraacetate, N-bromosuccinimide, bis(trifluoroacetoxy)iodobenzene, hydroxides, sodium hydroxide, or potassium hydroxide. The process then decomposes the isocyanate to the primary amine, releasing $CO_2$ at 16 in FIGS. 7 and (3) in FIG. 5. This may involve washing with water. A Curtius rearrangement may use an azide optionally accessed via an acid chloride to be converted to $NH_2$. If X is OH it can be converted to Cl, for example using $SOCl_2$, and if X=Cl it can be converted to $NH_2$ for the Hoffman rearrangement or to an alkyl azide (X=$N_3$) for the Curtius rearrangement.

As mentioned above, this method can also synthesize polyvinylamine derivative structures, starting from acrylamide monomer derivatives. In general, more structural variety is commercially available for acrylamide-based monomers versus VF-based monomers. For example, the equivalent methyl-VF monomer required to access the material proposed above is not commercially available and would need to be synthesized from alternative starting materials, likely through amide-coupling, which can be expensive, whereas methacrylamide is cheap and commonly available in bulk.

Figure 6:
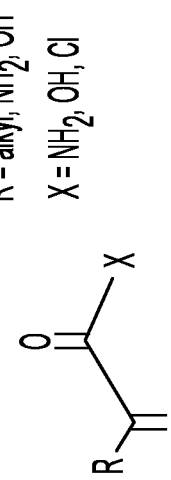
FIG. 6 shows alternative embodiments for an amine-convertible monomer.

The embodiments of the process here allow access a wider variety of polyvinylamine derivatives shown in FIG. 6, which allows for more control and tuning of material properties and functionality. For example, one such chain may involve perfluoroalkyl (PFA) components. $CO_2$ capture polymers containing perfluoroalkyl (PFA) chains have been shown to have superior amine efficiency and accessibility, due to the PFA chains breaking up interactions between amines (Koutsiano, et al. *J. Mater. Chem. A*, 2021, 09. 10827). The improvement in amine efficiency is so great that the material containing the PFA chains absorbs more mmol $CO_2$ per gram of polymer than the same material without the PFA chains, despite the large increase in molar weight caused by the PFA groups. This demonstrates the huge potential advantages given by having better structural tunability that allows for the wider variety of derivatives.

As mentioned above, the resulting material may have many uses, including as or in a sorbent for $CO_2$ separation as shown at 18 in FIG. 7. The material can be used as a temperature swing sorbent, temperature-vacuum swing sorbent, or a pressure swing sorbent, and in a fixed bed, fluidized bed, structured contactor, structured bed, or moving bed sorption process. The material may take the form of particles. The particles may have a size of no more than 1 millimeter. The sorbent may be used in the presence of other gases, including oxygen, oxyacids, sulfur oxides ($SO_X$) and nitrogen oxides ($NO_X$).

In this manner, a unique amine-containing polymer compound can be provided. The method of synthesizing the compound may also be used to synthesize other materials. These materials have better $CO_2$ capture properties and can be manufactured from available bulk feedstocks and employ deprotection processes that are thermally more favorable than current approaches.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

What is claimed is:

1. A polymer compound containing groups having the chemical structure:

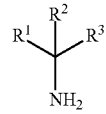

where $NH_2$ is a primary amine, and $R^1$, $R^2$ and $R^3$ are not hydrogen atoms; and
a polymer backbone wherein $R^1$ and $R^3$ are part of the polymer backbone,
wherein $R^2$ is selected from the group consisting of: amino, hydroxyl, perfluoro, fluoro, chloro, nitro, cyano, and heterocyclic.

2. The polymer compound as claimed in claim 1, wherein the polymer compound has an alkylene backbone.

3. The polymer compound as claimed in claim 1, wherein the polymer compound is formed by copolymerization of only amine-convertible monomers with one or more cross linkers.

4. The polymer compound as claimed in claim 1, wherein the polymer compound is a copolymer with non-amine-convertible monomers.

5. A porous aerogel comprising the polymer compound of claim 1.

6. The porous aerogel of claim 5, having at least one of the characteristics selected from the group consisting of a porosity of greater than 10%, a specific surface area of at least 100 $m^2/g$, a BET (Brunauer-Emmett-Teller) of greater than 50 $m^2/g$, and a wall thickness in the range of 10-1000 nanometers.

* * * * *